2,711,988

ESTROGENIC SULPHATES EXTRACTION PROCESS

Sidney Alfred Vindin Deans, Rosemount, Quebec, James Alexander Scarrow, Rosemere, Quebec, and Desmond Beall, Westmount, Quebec, Canada, assignors, by mesne assignments, to American Home Products Corporation, New York, N. Y., a corporation of Delaware No Drawing. Application June 3, 1950,
Serial No. 166,074

Claims priority, application Canada June 2, 1950

10 Claims. (Cl. 167—74.5)

This invention relates to a new process for the recovery of the estrogenic conjugates from urine or urinary liquids.

It is known that there can be extracted from unhydrolyzed equine urinary material water-soluble estrogenic conjugates which are useful therapeutic agents. These estrogenic conjugates are insoluble in common solvents such as benzene, chloroform, ethylene dichloride and others of the same classes.

APPLICANTS' DEVELOPMENT

The present invention provides a method by which common solvents can now be used to prepare an extract of the water-soluble estrogenic conjugates from dilute aqueous solutions of unhydrolyzed equine urinary material. In accordance with the present invention, the water-soluble estrogenic conjugates contained in an unhydrolyzed equine urinary solution which are normally insoluble in organic solvents selected from the group consisting of liquid aromatic hydrocarbons and liquid chlorinated hydrocarbons may be rendered soluble in such solvents. This is accomplished by converting them to their organic basic salts.

Proceeding in line with the invention a therapeutically active extract of the estrogenic water-soluble substances from unhydrolyzed equine urinary material is prepared by reacting a dilute aqueous solution of up to 250 mg. per liter of unhydrolyzed equine urinary material with a salt of an organic nitrogenous base reactive with the water-soluble estrogenic substance at a pH lower than 9 to form the corresponding organic basic salts. The reaction mixture is then extracted with an organic solvent selected from the group consisting of liquid aromatic hydrocarbons, preferably benzene and lower-molecular-weight liquid chlorinated aliphatic hydrocarbons. The organic phase is an extract of the desired estrogenic conjugates in the form of their organic basic salts.

If desired the residue upon evaporation of the organic phase obtained may be suspended in water and the aqueous solution is adjusted to a sufficiently high pH to liberate the free-base and form the alkali salts of the estrogenic conjugates. Separation of the free-base from the alkali salts of the estrogenic conjugates is obtained by extracting with a water-immiscible organic solvent, effective to remove the free-base, e. g. benzene or ether. Alternatively, the organic phase containing the organic basic salts of the estrogenic conjugates may be washed with an alkali hydroxide to give an aqueous phase containing the corresponding alkali salts of the estrogenic conjugates.

The aqueous solutions which contain the naturally occurring estrogenic conjugates are unhydrolyzed pregnant mares' urine or dilute aqueous solutions of concentrates thereof.

The organic nitrogenous bases and their salts which are used in accordance with the present invention are preferably aliphatic nitrogenous bases, for example, dimethylamine, cyclic aliphatic nitrogenous bases, for example, dicyclohexylamine, aromatic nitrogenous bases, for example, aniline, p-amino-acetophenone, dimethylaniline, dimethyl aminotoluene, heterocyclic nitrogenous bases, for example, pyridine, and substituted heterocyclic nitrogenous bases, for example 2-amino pyridine.

The water-immiscible organic solvents in which the organic basic salts of the estrogenic conjugates are soluble are preferably liquid aromatic hydrocarbons, for example, benzene, and lower-molecular-weight liquid chlorinated aliphatic hydrocarbons, for example, ethylene dichloride, chloroform, methylene chloride.

EXAMPLES

The present invention will be further understood by referring to the following examples which are given in an illustrative sense only.

*Example 1*

488 gallons of filtered pregnant mares' urine containing estrogenic sulphates equivalent to 750 mg. of sodium estrone sulphate per gallon as determined by a Marrian-Kober assay was treated with 11.25 kg. of procaine hydrochloride and 35 litres of muriatic acid (20° Bé.) to adjust the pH to 5 and was then extracted with 800 litres of chloroform by means of a Podbielniak centrifugal countercurrent extractor using a ratio of pregnant mares' urine to chloroform equal to 4:1 and a speed of 1750 R. P. M. The spent pregnant mares' urine contained estrogenic sulphates equivalent to 8.5 mg. of sodium estrone sulphate per gallon.

The chloroform extract containing the procaine estrogenic sulphates was vacuum distilled to remove all the chloroform thus yielding approximately 10 litres of syrup. The syrup was treated with water and pH adjusted to 11 with 50% sodium hydroxide solution thus converting the procaine estrogenic sulphates to sodium estrogenic sulphates and liberating the free procaine base. The aqueous solution at pH=11 was washed with 20 litres of benzene to remove the free procaine base and other impurities. The aqueous solution was then adjusted to pH 7, the estrogenic sulphate content being equivalent to 223 g. of sodium estrone sulphate as determined by Marrian-Kober assay. The recovery of estrogenic sulphates from pregnant mares' urine was therefore 61%.

In this example, chloroform may be replaced by other solvents including ethylene dichloride and methylene chloride.

*Example 2*

100 mg. of 2-amino pyridine in 1 ml. of water, was added to 100 ml. of unhydrolysed pregnant mares' urine which contained 18 mg. of conjugated estrogens, as determined by the Marrian-Kober colorimetric assay and read as sodium estrone sulphate. The solution was then adjusted to pH 6.0 with concentrated hydrochloric acid and extracted once with 100 ml. of ethylene dichloride. The ethylene dichloride extract contained 4.9 mg. of conjugated estrogens (read as sodium estrone sulphate). That is, 27% of the original estrogenic potency of the urine had been extracted.

*Example 3*

200 mg. of dimethylamine hydrochloride, dissolved in 1 ml. of water, was added to 100 ml. of unhydrolysed pregnant mares' urine, which contained 18 mg. of conjugated estrogens, as determined by the Marrian-Kober colorimetric assay and read as sodium estrone sulphate. The solution was then adjusted to pH 6.0 with concentrated hydrochloric acid and extracted once with 100 ml. of ethylene dichloride. The ethylene dichloride extract contained 2.7 mg. of conjugated estrogens (read as sodium estrone sulphate). That is, 15% of the original estrogenic potency of the urine had been extracted.

Example 4

100 mg. of dicyclohexylamine hydrochloride, dissolved in 5 ml. of water was added to 100 ml. of unhydrolysed pregnant mares' urine, which contained 18 mg. of conjugated estrogens, as determined by the Marrian-Kober colorimetric assay and read as sodium estrone sulphate. Th solution was adjusted to pH 6.0 with concentrated hydrochloric acid and extracted once with 100 ml. of ethylene dichloride. The ethylene dichloride extract contained 18 mg. of conjugated estrogens (read as sodium estrone sulphate). That is, 100% of the original potency of the urine had been extracted.

Example 5

1 ml. of aniline was added to 100 ml. of unhydrolysed pregnant mares' urine which contained 18 mg. of conjugated estrogens, as determined by the Marrian-Kober colorimetric assay and read as sodium estrone sulphate. The solution was adjusted to pH 6.0 with concentrated hydrochloric acid and extracted once with 100 ml. of ethylene dichloride. The ethylene dichloride extract contained 1.8 mg. of conjugated estrogens (read as sodium estrone sulphate). That is, 10% of the original potency of the urine had been extracted.

Example 6

20 ml. of pyridine was added to 100 ml. of unhydrolysed pregnant mares' urine, which contained 18 mg. of conjugated estrogens, as determined by the Marrian-Kober colorimetric assay and read as sodium estrone sulphate. The solution was adjusted to pH 6.0 with concentrated hydrochloric acid and extracted once with 100 ml. of ethylene dichloride. The ethylene dichloride extract contained 9.0 mg. of conjugated estrogens (read as sodium estrone sulphate). That is, 50% of the original potency of the urine had been extracted.

Example 7

100 mg. of procaine hydrochloride in 1 ml. of water was added to 100 ml. of unhydrolysed pregnant mare's urine, which contained 18 mg. of conjugated estrogens, as determined by the Marrian-Kober colorimetric assay and read as sodium estrone sulphate. The solution was adjusted to pH 6.0 with concentrated hydrochloric acid and extracted once with 100 ml. of methylene chloride. The methylene chloride extract contained 11.3 mg. of conjugated estrogens (read as sodium estrone sulphate). That is, 63% of the original potency of the urine had been extracted.

Example 8

1 g. of procaine hydrochloride in 10 ml. of water was added to 1 litre of unhydrolysed pregnant mares' urine, which contained 180 mg. of conjugated estrogens, as determined by the Marrian-Kober colorimetric assay and read as sodium estrone sulphate. The solution was adjusted to pH 6.0 with concentrated hydrochloric acid and extracted once with 1 litre of methylene chloride. The methylene chloride extract contained 120 mg. of the conjugated estrogens (read as sodium estrone sulphate). That is, 67% of the original potency of the urine had been extracted.

Example 9

2.5 g. of dicyclohexylamine acetate in 25 ml. of water was added to 1 litre of unhydrolysed pregnant mares' urine (pH 8.2) which contained 250 mg. of conjugated estrogens, as determined by the Marrian-Kober colorimetric assay and read as sodium estrone sulphate. The solution was extracted with 500 ml. of benzene. The benzene extract contained 210 mg. of the conjugated estrogens (read as sodium estrone sulphate). That is, 84% of the original potency of the urine had been extracted.

Example 10

2.5 g. of dicyclohexylamine acetate in 25 ml. of water were added to 1 litre of unhydrolysed pregnant mares' urine (pH 8.2) which contained 250 mg. of conjugated estrogens, as determined by the Marrian-Kober colorimetric assay and read as sodium estrone sulphate. The solution was extracted with 500 ml. of chloroform. The chloroform extract contained 235 mg. of the conjugated estrogens (read as sodium estrone sulphate). That is, 94% of the original potency of the urine had been extracted.

Suitable changes and modifications that do not depart from the spirit of the disclosure are contemplated as following the scope of the invention.

We claim:

1. A process for the preparation of a therapeutically active extract of unhydrolyzed equine urinary material consisting essentially of: (1) providing a dilute aqueous solution of unhydrolyzed equine urinary material containing not over about 250 mg. per liter water-soluble estrogenic conjugates normally insoluble in an organic solvent selected from the group consisting of benzene and lower-molecular-weight liquid chlorinated aliphatic hydrocarbons, said solution being of the class consisting of equine urine and dilute solutions of concentrates thereof, (2) reacting therewith at a pH in the range from 5.0 to less than 9.0 and in the absence of added inorganic base, a sufficient amount of organic nitrogenous base salt to form amine salts with the conjugated estrogens of the urinary material, said nitrogenous base salt being selected from the group consisting of salts of alkyl amines, unsubstituted cycloalkyl amines, unsubstituted monocyclic aromatic-hydrocarbon amines, p-aminoacetophenone, dimethyl aminotoluene, procaine, pyridine, aminopyridines and mixtures thereof, whereby an aqueous solution of amine salts of the conjugated estrogen soluble in said solvent is formed, (3) adding said solvent to said aqueous solution to extract substantially the entire content of amine salts of the conjugated estrogens from the aqueous solution, and (4) separating from the aqueous phase the resulting organic-solvent phase containing the organic base salts of the estrogen conjugates.

2. A process according to claim 1, in which the organic phase containing the extract is dried to obtain a residue of the organic-base salts of the estrogenic conjugates.

3. A process as defined in claim 1, in which the unhydrolyzed equine urinary material is that of pregnant mares.

4. A process for the preparation of a therapeutically active extract of equine urinary material as defined in claim 1, in which the organic nitrogenous base is an alkyl amine.

5. A process for the preparation of a therapeutically active extract of equine urinary material as defined in claim 1, in which the organic nitrogenous base is an unsubstituted cycloalkyl amine.

6. A process for the preparation of a therapeutically active extract of equine urinary material as defined in claim 1, in which the organic nitrogenous base is a monocyclic aromatic-hydrocarbon amine.

7. A process for the preparation of a therapeutically active extract of equine urinary material as defined in claim 1, in which the organic nitrogenous base is pyridine.

8. A process for the preparation of a therapeutically active extract of equine urinary material as defined in claim 1, in which the organic nitrogenous base is an aminopyridine.

9. A process as defined in claim 1 in which the organic nitrogenous base salt is formed in situ by adding to the reaction mixture in step (2) the free organic nitrogenous base and at least an equivalent amount of acid.

10. Process of extracting conjugated estrogens from gravid mare's urine comprising adding acid to said urine until the pH is about 5.0, adding an alkyl amine and a solvent selected from the group consisting of benzene and ethylene dichloride to the gravid mare's urine while maintaining the pH of the urine at about 5.0 to extract the conjugated estrogens into the organic solvent phase, separating the organic solvent phase from the aqueous phase and recovering the conjugated estrogen from the organic solvent.

References Cited in the file of this patent

UNITED STATES PATENTS

| | | |
|---|---|---|
| 2,429,398 | Cook et al. | Oct. 21, 1947 |
| 2,519,516 | Turner et al. | Aug. 22, 1950 |
| 2,534,121 | Grant et al. | Dec. 12, 1950 |